(12) United States Patent
Akazawa (10) Patent No.: US 6,168,140 B1
(45) Date of Patent: Jan. 2, 2001

(54) AIR TREATING DEVICE

(76) Inventor: Yasumasa Akazawa, 2-18-14, Higashishinmachi, Matsubara, Osaka (JP)

( * ) Notice: Under 35 U.S.C. 154(b), the term of this patent shall be extended for 0 days.

(21) Appl. No.: 09/218,403

(22) Filed: Dec. 22, 1998

(30) Foreign Application Priority Data

May 6, 1998 (JP) .................................................. 10-123285

(51) Int. Cl.[7] .................................................. B01F 3/04
(52) U.S. Cl. .............................. 261/80; 261/94; 261/95; 261/100
(58) Field of Search ................... 261/100, 80, 94, 261/95, DIG. 3

(56) References Cited

U.S. PATENT DOCUMENTS

| 3,858,331 | * | 1/1975 | Lord . | |
|---|---|---|---|---|
| 3,868,835 | * | 3/1975 | Todd-Reeve . | |
| 3,892,047 | * | 7/1975 | Muller-Scherak . | |
| 3,898,039 | * | 8/1975 | Lin | 21/108 |
| 4,218,963 | * | 8/1980 | Burnetter | 55/473 |
| 5,361,516 | * | 11/1994 | Dahman | 34/440 |
| 5,799,842 | * | 9/1998 | Rumsey | 223/1 |

* cited by examiner

Primary Examiner—Chester T. Barry
(74) Attorney, Agent, or Firm—Moonray Kojima (57) ABSTRACT

The present invention relates to an air treating device to be used for prevention of drying of air or cleaning of air, convenient for carrying and yet capable of humidifying the air in a room as required, by being disposed in the air feed unit of an equipment having an air delivering function and comprising diffusing pieces exposed to the delivered air as required to promote diffusion of liquid components, a diffusing piece mounting unit holding the diffusing pieces, and a mounting means for facing the diffusing pieces to the air feed unit.

8 Claims, 14 Drawing Sheets

AIR TREATING DEVICE

BACKGROUND OF THE INVENTION

1. Field of the invention

The present invention relates to an air treating device to be used for prevention of drying of air and for cleaning of air.

2. Description of the prior art

Staying for a long time in a room with dry air may cause sour throat. This becomes conspicuous especially while a person is lodging or sleeping at a hotel, etc. during a business trip or a journey and the occupant of the room may feel uncomfortable with a sore throat, eventually leading to failure of his/her physical condition.

A humidifier is known conventionally as equipment for humidifying air, but the usual humidifier is unfit for carrying because of its large dimensions and weight.

SUMMARY OF THE INVENTION

The main object of the present invention is to provide an air treating device which is convenient for carrying and yet is capable of humidifying the air in a room (including the cabin of a movable body) as required, by being disposed on an air feed unit of an equipment having an air delivering function and comprising diffusing pieces exposed to the delivered air as required to promote diffusion of its liquid components, a diffusing piece mounting unit supporting the diffusing pieces, and a mounting means for positioning the diffusing pieces to be exposed to the air feed unit.

Another object of the present invention is to provide an air treating device which is capable of sharply improving the humidifying efficiency, wherein the diffusing pieces comprise absorbing members having a liquid absorbing function.

Still another object of the present invention is to provide an air treating device which is capable of providing humidifying effects and functions and effects of fragrance, deodorization, sterilization, etc., by using a treating liquid containing various components as required (components of fragrance, deodorization, sterilization, etc., for example).

Yet another object of the present invention is to provide an air treating device which is capable of preserving the humidifying effects (or functions and effects) for a long time, by providing a liquid storing unit in which to immerse part of the diffusing piece in the liquid.

A further object of the present invention is to provide an air treating device which is capable of realizing compact dimensions during non use of the air treating device and achieving further improvement of portability, by constructing at least the diffusing pieces in a way to be stored inside a liquid storing unit.

A still further object of the present invention will become clear with the description of the embodiment to be presented hereafter.

DESCRIPTION OF THE PREFERRED EMBODIMENT

An embodiment of the present invention will be described in detail hereafter by referring to drawings.

Figure 1:
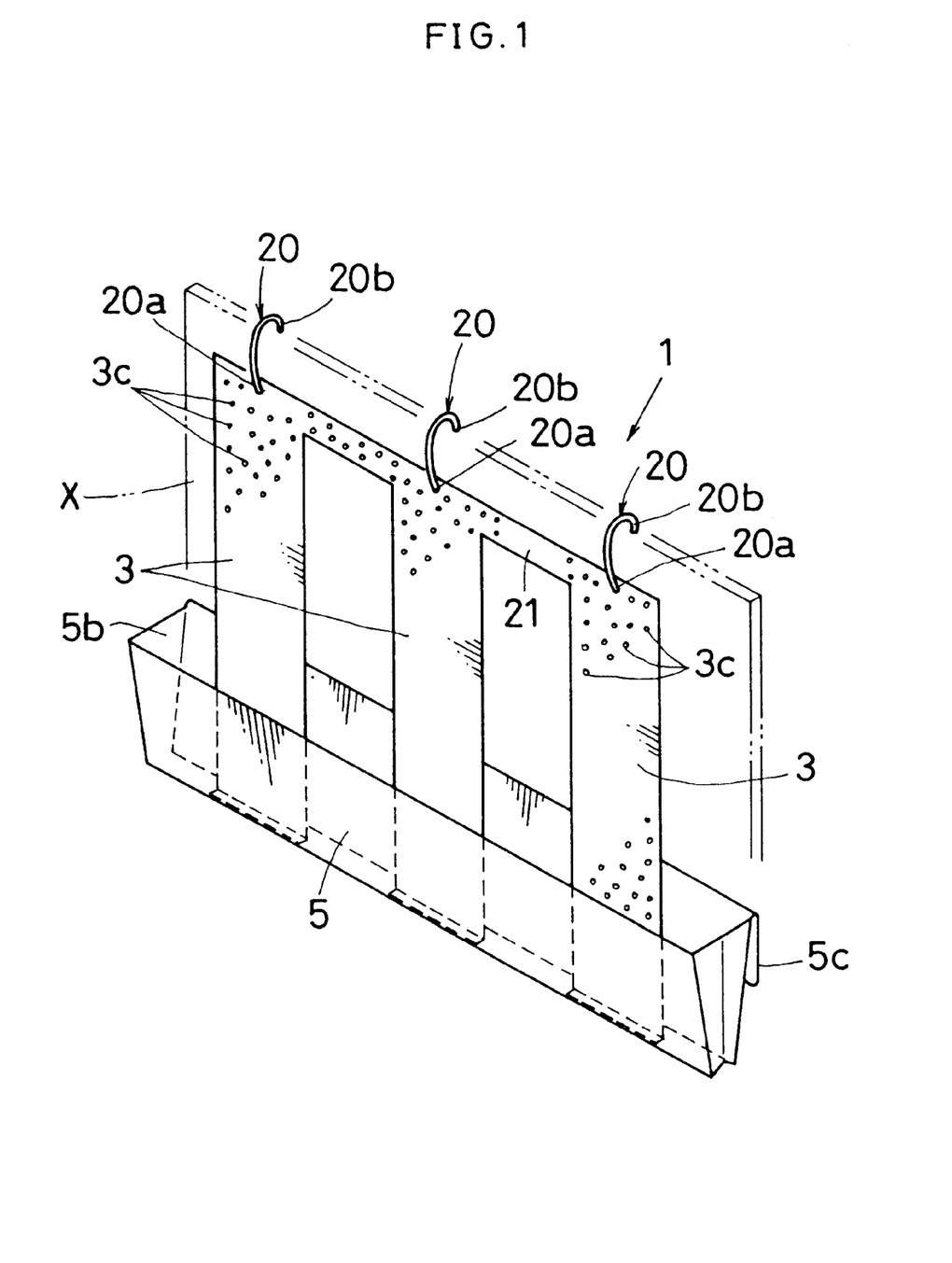
FIG. 1 is a perspective view showing an air treating device of the present invention.

FIG. 1 indicates an air treating device 1. This air treating device 1 is used by being mounted on the front face side of the air feed unit X of an air conditioning device such as air conditioner, etc. in a room (including the cabin of a movable body such as automobile, etc.).

This air treating device 1 is provided with diffusing pieces, fastening devices 20 serving as both mounting means for mounting these diffusing pieces 3 in prescribed position and diffusing piece mounting unit for hanging and supporting the diffusing pieces 3, and a liquid storing unit 5 the bottom end of which is fixed inside on the bottom face.

A diffusing piece 3 is constructed in the shape of a front looking fancy strip with suitable water absorbing cloth or paper, etc. capable of absorbing liquid to improve humidifying and/or other effects. While a large number of air holes 3c are formed in the diffusing piece 3 to improve air permeability, the diffusing piece 3 may also be constructed by forming a plurality of pleats to further improve air permeability and to also increase the contact surface area with the air delivered from the air feed unit X. In the case where the diffusing piece is constructed by bundling a large number of fibers without twisting them, in place of the illustrated diffusing piece 3 in the shape of a fancy strip, improvement of air permeability and increase of contact surface can be expected.

A plurality of such diffusing pieces 3 are installed side by side at suitable intervals in a way to fit the size of the air feed unit X.

A fastening device 20, integrally fixed to the diffusing piece 3 by having its bottom end 20a mounted to the top end of the latter, is constructed by having its top end curved in the shape of an arc to be fastened to the top end of the projected part of the air feed unit X. At the top end 20b may be mounted a rubber member for protection against slipping. The top ends of the diffusing pieces 3 are connected to one another with a connecting portion 21, so as to integrate the respective diffusing pieces 3 and simplify their fastening. The bottom ends may also be connected to one another in addition to the top ends, or the connecting portion 21 may be omitted.

The liquid storing unit 5, which aims at preserving humidifying effects for a long time, is composed of synthetic resin sheets, and formed in the shape of a slender bag in the transverse direction opening at the top, and is provided with a lid 5c for opening and closing the opening 5b at the top face.

Figure 2:
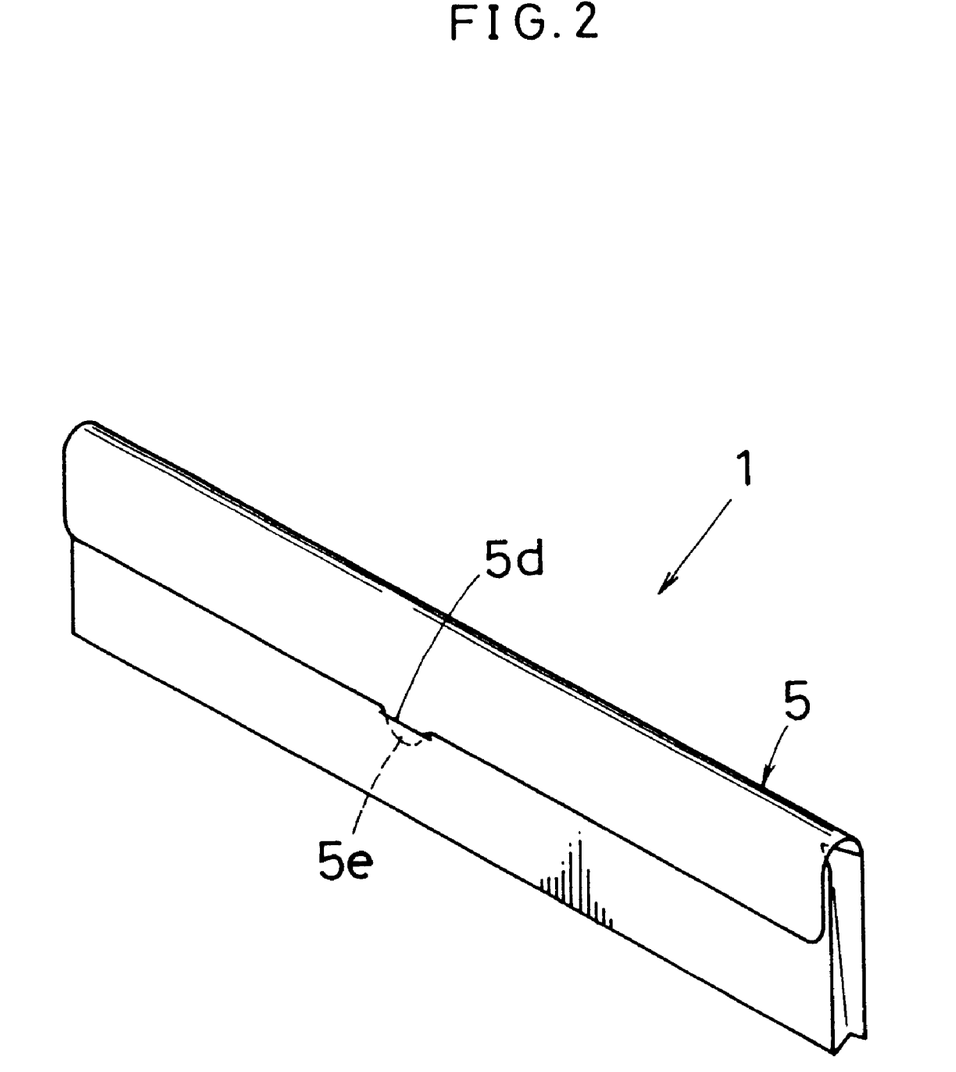
FIG. 2 is a perspective view showing the folded state of the air treating device in FIG. 1.

This air treating device 1 takes a compact shape convenient for carrying as shown in FIG. 2 when the lid 5c is closed after removing the fastening device 20 from the state of use in FIG. 1 and storing it in the liquid storing unit 5 together with the diffusing pieces 3. At the front edge of the lid 5c is formed an insert 5e which can be inserted in a notch 5d, so as to maintain a closed state.

Figure 3:
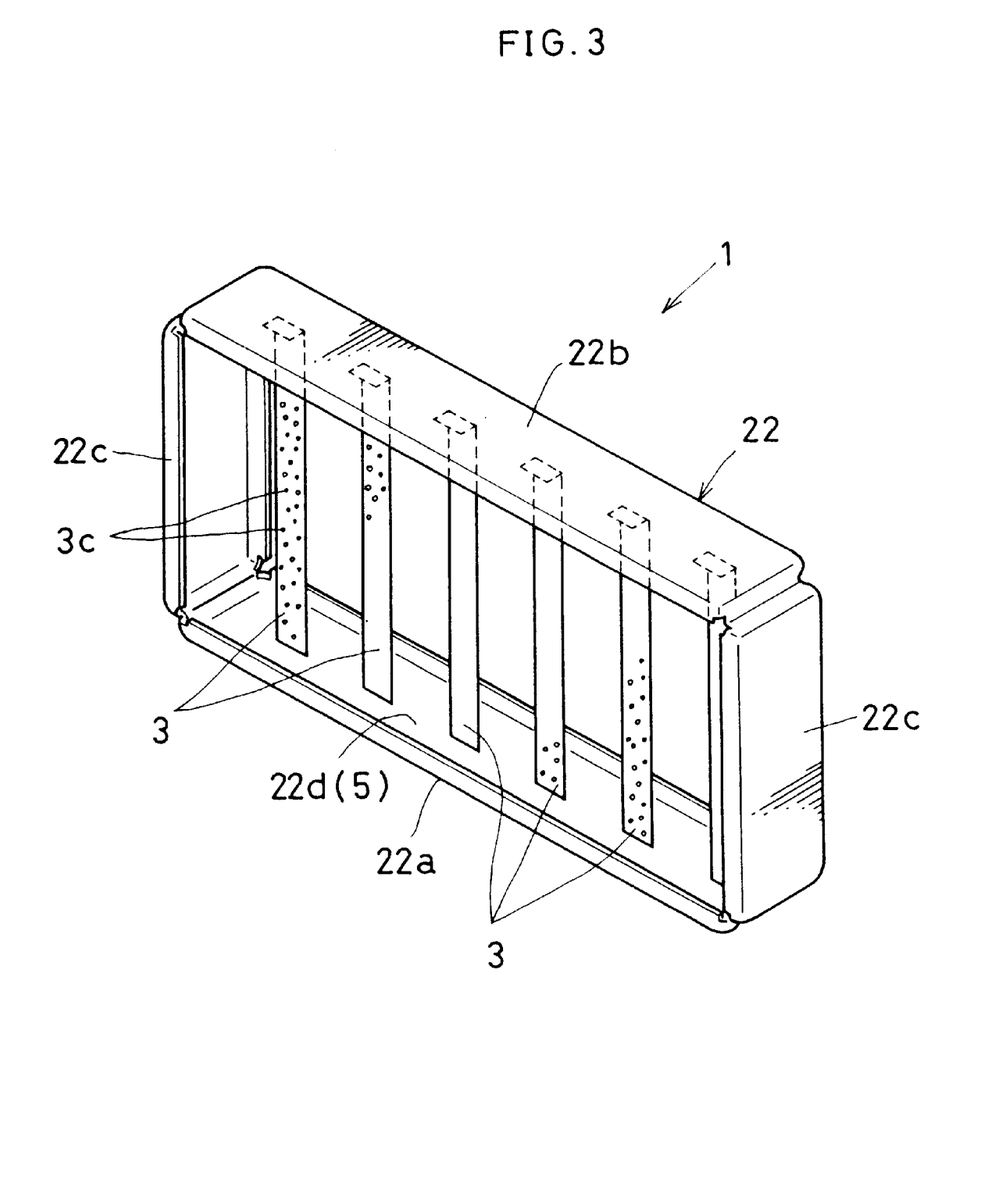
FIG. 3 is a perspective view showing another embodiment of the air treating device in FIG. 1.
Figure 4:
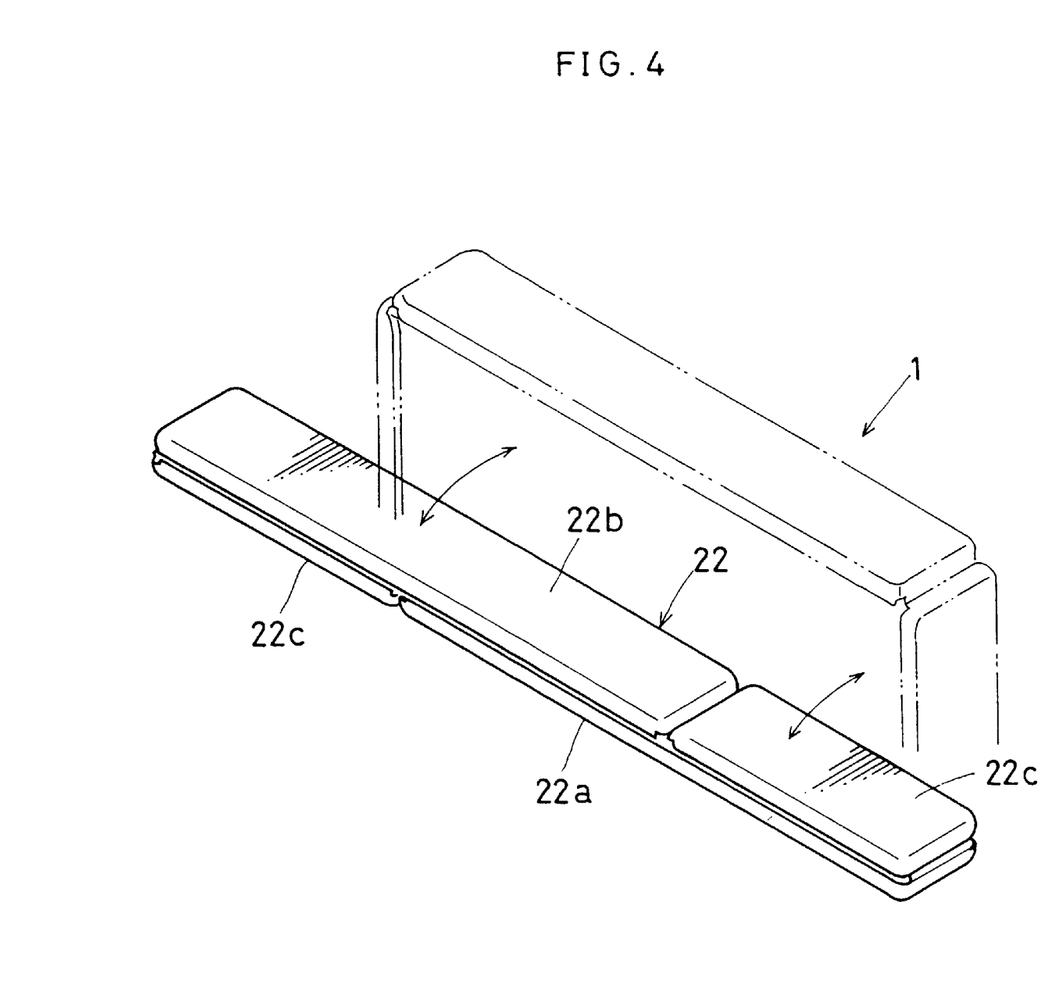
FIG. 4 is a perspective view showing the folded state of the air treating device in FIG. 3.

The liquid storing unit 5 may be formed with a mounting frame 22 which is integral with the diffusing piece mounting unit as shown in FIG. 3 in place of the construction in FIG. 1. Namely, the mounting frame 22 is formed with synthetic resin in the shape of a square frame composed of 4 side members 22a, 22b, 22c, 22c which can be folded flat as shown in FIG. 4, forming a concave part 22d at the bottom side member 22a and hanging, on the top side member 22b, a plurality of diffusing pieces 3 at suitable intervals. The concave part 22d is used as the liquid storing unit 5.

The mounting frame 22 in FIG. 3, FIG. 4 may be provided with a band, etc. (not illustrated) holding the folded state in the case where it is constructed by being urged in a way to take the shape of FIG. 3 in normal state, and provided with a bar member (not illustrated) stretching in the vertical direction to maintain the shape of FIG. 3 in the case where it is constructed in a way to take the shape of FIG. 4 in a normal state.

Here, if the size of the internal circumference of the mounting frame 22 is adjusted to a size fit and corresponding to the projection of the air feed unit X, the bar member and the separate mounting means become unnecessary.

Figure 5:
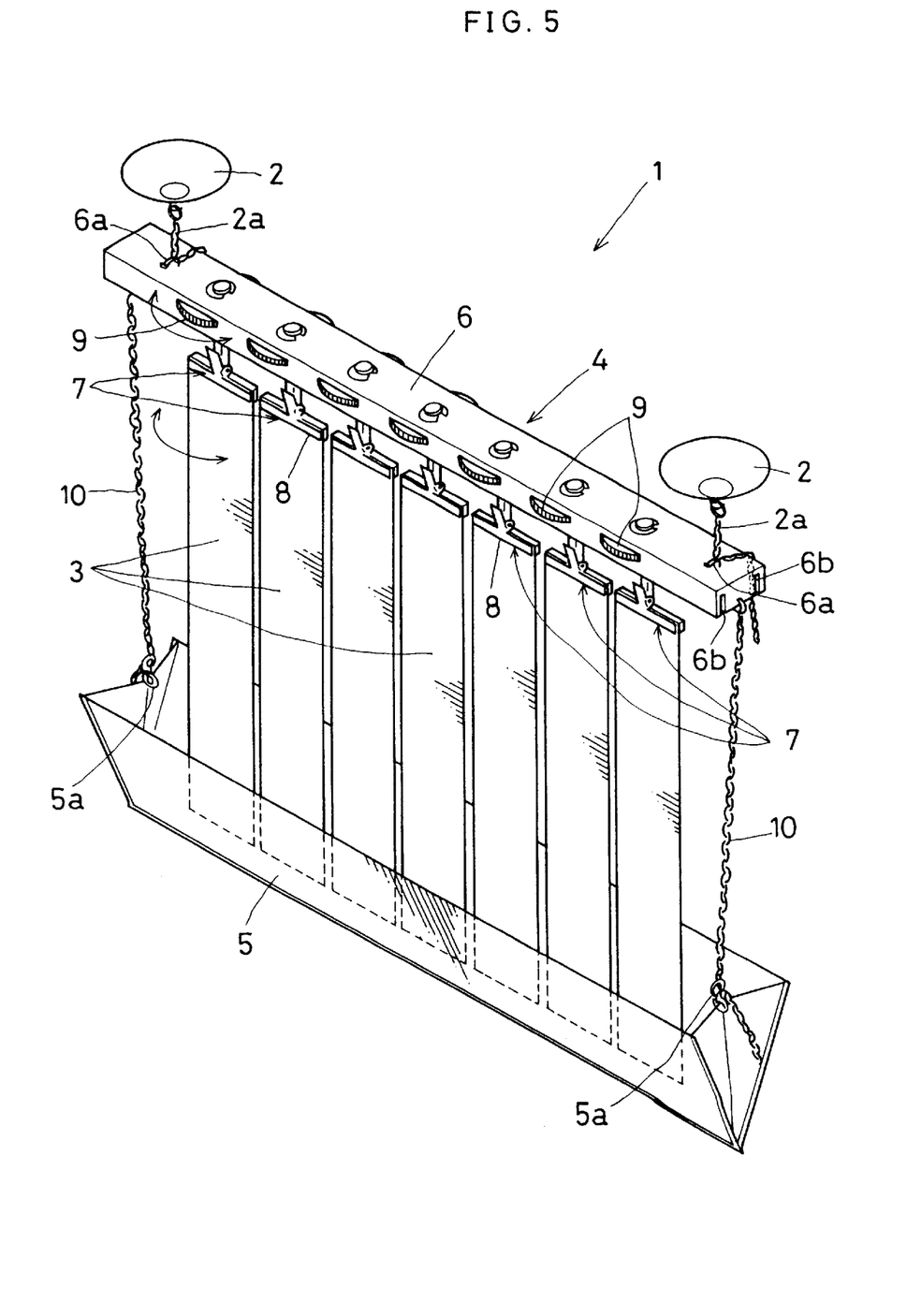
FIG. 5 is a perspective view showing still another embodiment of the air treating device.

Moreover, as shown in FIG. 5, it is also possible to construct the air treating device 1 with suction cups 2 as mounting means for mounting in a prescribed position, diffusing piece mounting unit 4 for hanging diffusing pieces 3 and a liquid storing unit 5 in which to immerse part of the diffusing pieces 3.

A diffusing piece 3 is constructed in the shape of a fancy strip with suitable water absorbing cloth or paper, etc. capable of absorbing liquid. The diffusing piece mounting unit 4 for hanging the diffusing piece 3 is used to hang the diffusing piece 3 by pinching it at the top end, which is provided in a plurality of pieces side by side in the transverse direction. Namely, a hanging rail 6 of a suitable length corresponding to the breadth of the air feed unit X is provided, and a plurality of hanging members 7 are mounted to the hanging rail 6 along its longitudinal direction.

Figure 8:
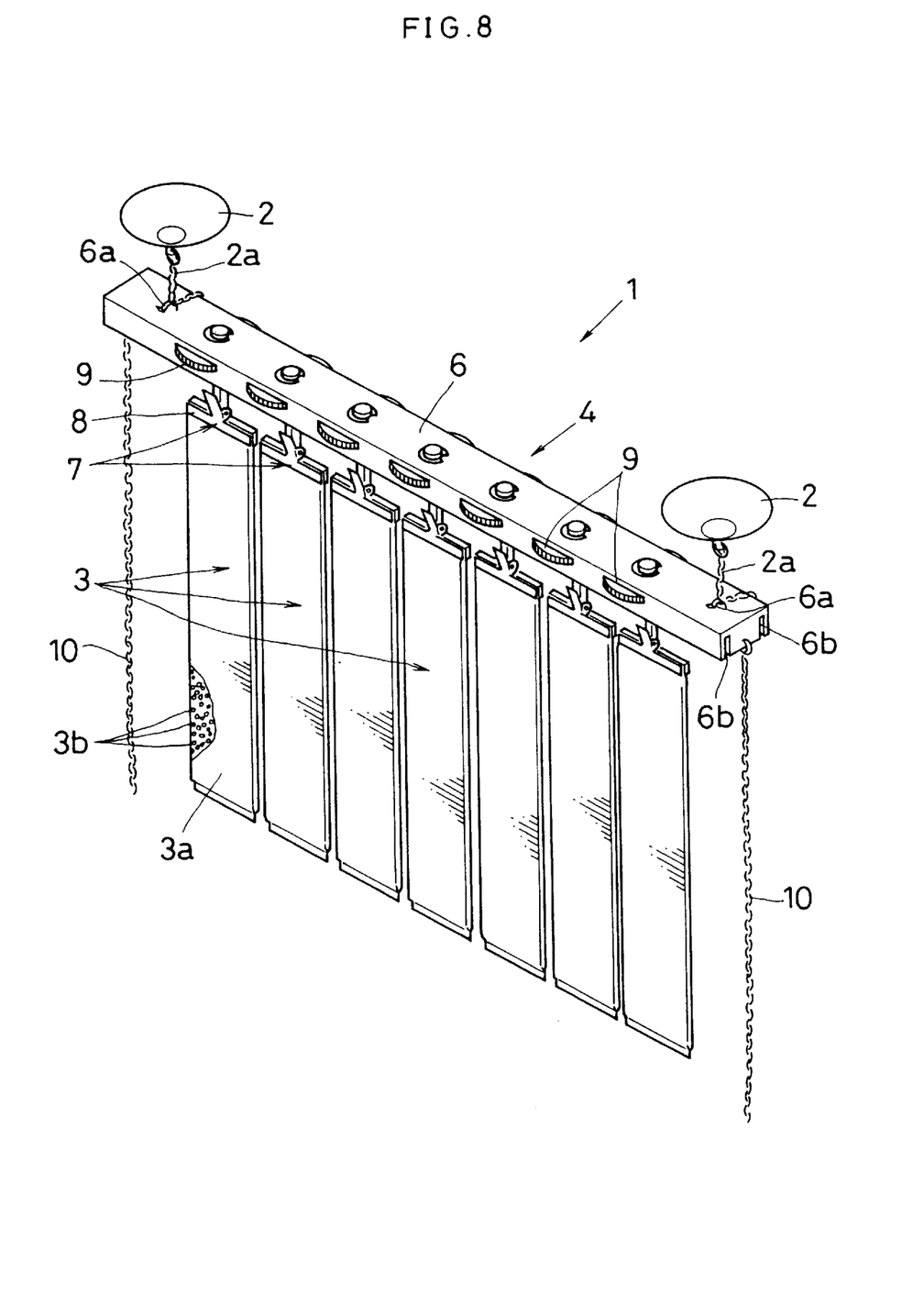
FIG. 8 is a perspective view showing yet another embodiment of the air treating device.

The hanging members 7, having a pinching unit 8, are inserted in the hanging rail 6 from below and rotatably held there, as shown in FIG. 8. A hanging member 7 is constructed by forming the portion 7b other than the top end part 7a in the shape of an angular pillar and holding, at the top, an operating unit 9 of a diameter larger than the breadth of the hanging rail 6, in a way to change the orientation of the pinching unit 8 i.e. the orientation of the diffusing piece 3 by turning the operating unit 9.

Figure 6:
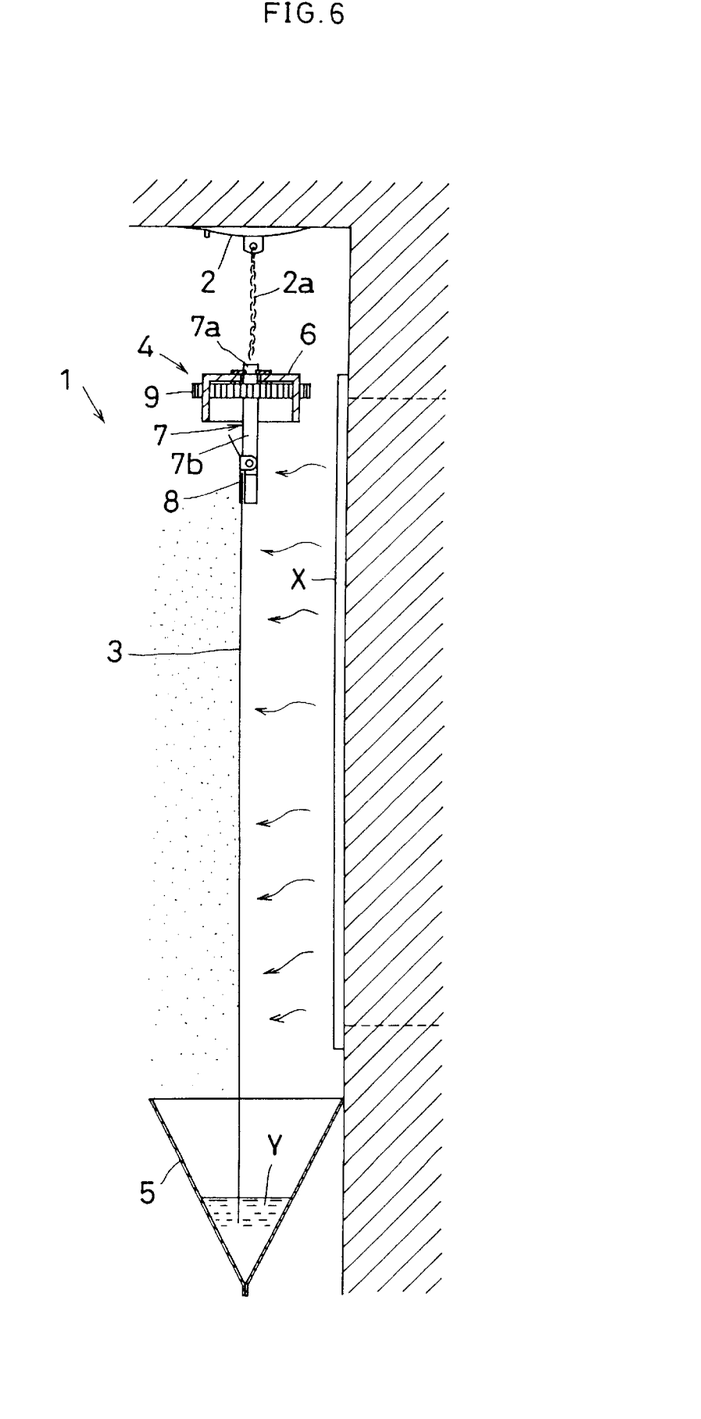
FIG. 6 is a sectional view of the state in use of the air treating device in FIG. 5.

At the top of the hanging rail 6 is provided a suction cup 2 as means for mounting the device to the ceiling face, etc. on the front face side of the air feed unit X as shown in FIG. 6. The mounting of the suction cup 2 is made by means of a chain member 2a one end of which is fixed to the suction cup 2, and a suitable position on the other end of the chain member 2a is detachably fastened to a hook 6a formed on the top face of the hanging rail 6. If the chain member 2a is formed sufficiently long, the distance from the suction cup 2 to the hanging rail 6 can be changed as desired, thus enabling mounting of the device to the mounting position. As the mounting means, other means such as hook, magnet, tape, etc. may also be used in place of the suction cup 2.

The liquid storing unit 5 is composed of synthetic resin sheets, and formed in the shape of a slender and shallow bag the top face of which may be opened and closed. This construction enables folding, and thus realizes a compact size. To the top part at intermediate position in the direction of breadth of the liquid storing unit 5 are fixed fastening members 5a for fastening a part of the chain member 10. To the fastening members 5a is fastened a part of the chain members 10 pending from both ends of the hanging rail 6, to hold the liquid storing unit 5 by hanging it below the hanging rail 6.

By thus making the distance between the hanging rail 6 and the liquid storing unit 5 adjustable, it becomes possible to adapt them to the size of the air feed unit X. It is also all right to make the hanging by using some other means such as belt-shaped member instead of the chain members 10, or mount the liquid storing unit 5 separately with an independent mounting means and position it below the hanging rail 6. In the liquid storing unit 5 is injected a treating liquid Y, and the bottom part of the hung diffusing pieces 3 is dipped in it. The liquid storing unit 5 may also be used simply for receiving the treating liquid Y flowing down from the diffusing pieces 3, without storing the treating liquid Y in it.

The air treating device 1 constructed as described above (see FIG. 1 FIG. 6) can be used as follows:

To protect his/her throat against damage due to drying of air during his/her sleep at a hotel, etc., the user pours water as treating liquid Y into the liquid storing unit 5, and has the water absorbed by the diffusing pieces 3 either previously set or prepared separately.

The reason why separately prepared diffusing pieces are used is that this enables use of suitable material such as tissue paper, etc. with the construction shown in FIG. 5 and FIG. 6, and the material is either cut into the shape of strips as illustrated to be pinched at the pinching units 8, or hung by winding in the shape of twisted-paper strings. This hanging allows the bottom part of the diffusing pieces 3 to be dipped in the treating solution Y in the liquid storing unit 5. The diffusing pieces 3 dipped in the treating solution Y efficiently absorb the water which fills the inside of the material texture.

In the case where the diffusing pieces 3 are positioned on the front face side of the air feed unit X as shown in FIG. 1 or FIG. 6, by using either fastening devices 20 or suction cups 2 as the mounting means, the diffusing pieces 3 are exposed to the delivered air. Although the diffusing pieces 3 evaporate their water content even under natural conditions, this evaporation is further promoted by the delivered air. A diffusing piece 3 with small meshes mainly repels the air and does not allow it to pass through, but a diffusing piece 3 of a permeable material lets the air pass through and discharges the water content into the atmosphere in the room. At that time, with the construction of FIG. 5, FIG. 6, the angle of the respective hanging members 7 can be changed as required depending on the state of drying or the user's taste, to control the volume of the air hitting against the diffusing pieces 3.

The water content diffused into the atmosphere in the room is carried by the delivered air and spreads to the entire part of the space there. Therefore, drying of the air is prevented, and the user can maintain a good physical condition. Moreover, if aromatic liquid such as perfume, deodorizer, germicidal agent, etc. are added in addition to pure water, they can demonstrate various functions and effects according to their respective natures.

The dust and dirt contained in the delivered air hit against the diffusing pieces 3 and are absorbed by the latter. For that reason, this air treating unit 1 also has functions and effects of an air cleaner.

Figure 7:
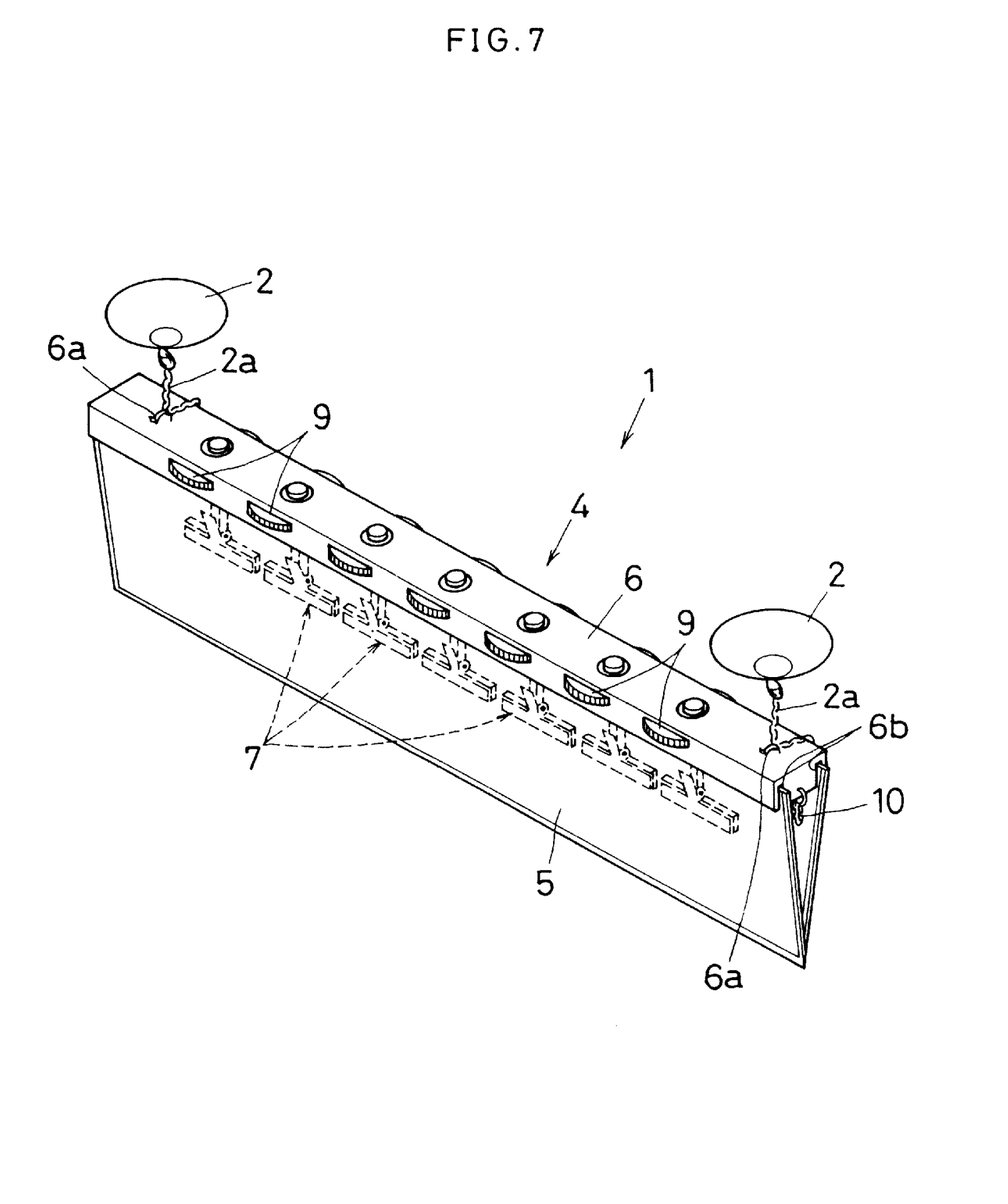
FIG. 7 is a perspective view showing the folded state of the air treating device in FIG. 5.

When the air treating unit 1 is out of use, it is folded as shown in FIG. 2, FIG. 4 and FIG. 7. With the construction of FIG. 5, FIG. 6, the four corners at top end of the folded liquid storing unit 5 are inserted and held in the slits 6b at four corners of the hanging rail 6, to integrate the respective elements in a compact size convenient for carrying, thus making it possible to achieve all of the objects.

On the other hand, in the case where the diffusing pieces 3 are constructed by sealing highly water absorbing resin 3b in paper bag 3a, etc. as shown in FIG. 8, the liquid storing unit 5 can be omitted because the highly water absorbing resin 3b sufficiently holds water content and indicates respiration. With the construction of FIG. 8, the liquid storing unit 5 may be removed from the chain member 10. The diffusing pieces 3 in FIG. 8 can also be used for the air treating unit 1 indicated in FIG. 1~FIG. 4.

FIG. 9 to FIG. 14 indicate another embodiment of the air treating unit 1.

Figure 9:
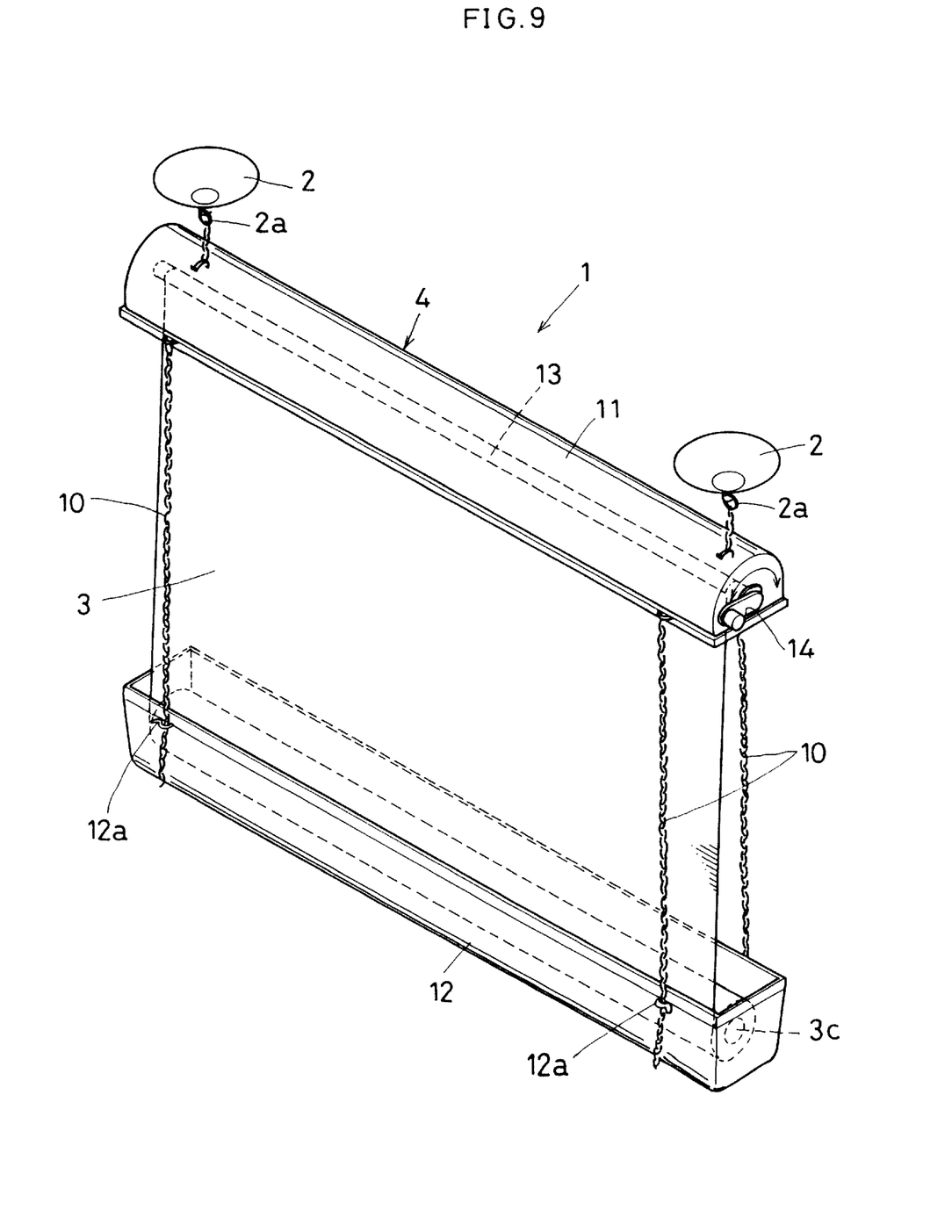
FIG. 9 is a perspective view showing a further embodiment of the air treating device.
Figure 10:
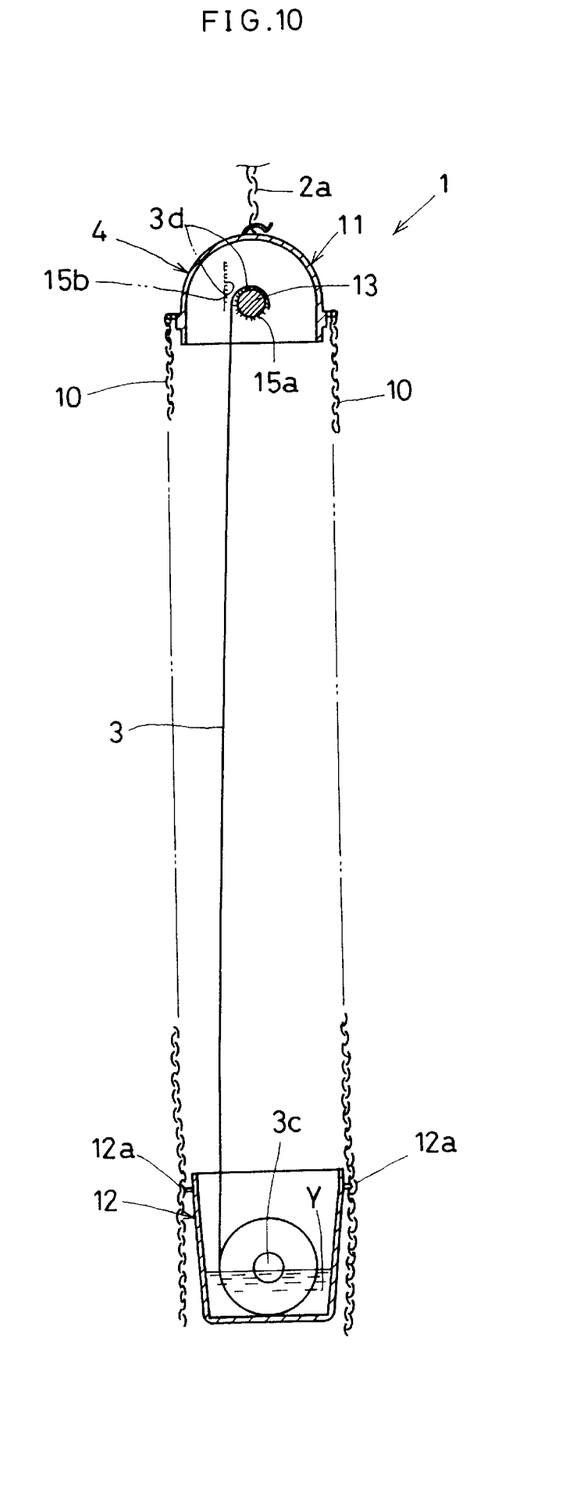
FIG. 10 is a sectional view of the air treating device in FIG. 9.

The air treating unit 1 in FIG. 9, FIG. 10 is realized by winding the diffusing piece 3.

The diffusing piece 3 is formed of a long length with a breadth corresponding to the air feed unit X, and is wound in the shape of a roll in the longitudinal direction on a core member 3c of suitable weight, so that it may be taken up depending the degree of use.

The mounting means is constructed in the same way as in the preceding embodiment, and the diffusing piece mounting unit 4 provided with mounting means is composed of a winding shaft case 11 (hereinafter simplified to be upper case) and a storing case (hereinafter simplified to be lower case) which can be mutually fit. The upper case 11 and the lower case 12 have a slender box shape for storing the diffusing pieces 3, and the upper case 11 is fit in the lower case 12 from above. The bottom face of the upper case 11 is open while the top face is formed in the shape of an arc, and a take-up shaft 13 is provided in it in the longitudinal direction. At one end of the take-up shaft 13 is provided a handle 14 for turning this shaft 13. On the circumferential face of the take-up shaft 13 is provided a means for fixing one edge 3d of the diffusing pieces 3. The construction in this embodiment uses one side 15a of a face fastener as fixing means, to be engaged with the other side 15b of the face fastener fixed to either the diffusing pieces 3 themselves or to one edge 3d of the diffusing piece 3.

One end of the chain members 10 is engaged with the four corners on the outer side face of the upper case 11. The chain members 10 provide the same functions and effects as those of the chain members 10 in the preceding embodiment, and positions the lower case 12 which also serves as liquid storing unit below the upper case 11.

The lower case 12 has a shape of bottomed box, and at four corners on the outer side face are formed hooks 12a for detachably engaging optional position of the chain members 10.

The air treating device 1 indicated in FIG. 9, FIG. 10 is used by pouring a treating liquid Y in the lower case. As the degree of staining of the diffusing piece 3 increases by absorbing dust and dirt in the course of use, the dirt is removed with turning of the handle 14. This enables continuous use of this device. The diffusing piece is protected against any unnecessary loosening at the time of take-up, because it is wound around the core member 3c of proper weight.

To fix one edge 3d of the diffusing piece 3 to the take-up shaft 13, it may be all right to insert one edge 3d of the diffusing piece 3 in this shaft 13 for fastening, but use of face fasteners 15a, 15b as in this embodiment will make the fixing operation simpler.

Moreover, the diffusing piece 3, wound in the shape of a long roll, can be sufficiently adapted to an air feed unit X which is longer in the longitudinal direction than the length of the chain member 10.

It is also all right to form, on said upper case 11, a portion in the shape of a gutter capable of storing a liquid and construct the diffusing piece 3 in a way to be rolled downwardly with the treating liquid Y stored in the gutter-shaped portion. This construction is effective for extending the diffusing piece 3 in the vertical direction, because the treating liquid Y flows down by its own weight.

Figure 11:
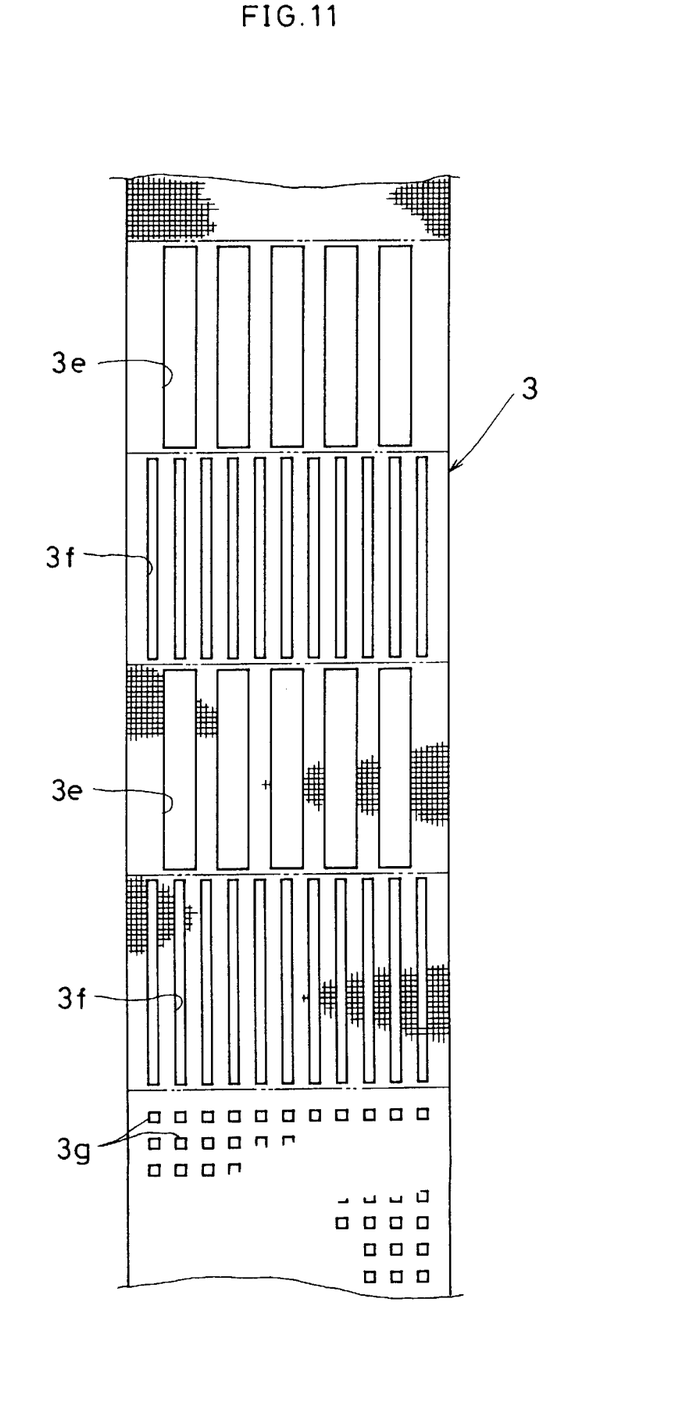
FIG. 11 is a plan view showing another embodiment of the diffusing piece.

Furthermore, the diffusing piece 3 may also be constructed in such a way that, the surface areas of openings 3e, 3f, 3g are different at each length as required, in the longitudinal direction, as shown in FIG. 11. In this case, by enabling take-up in both upward and downward directions, it becomes possible to select openings suitable to the degree of humidification.

Still more, since the upper case and the lower case are formed in a way to be mutually fit, they are turned into a single member if fit together when they are not in use, thus facilitating handling and improving portability. And yet, by adopting a fitting structure securing airtightness, it prevents leakage of water or water content from inside the case 12.

Figure 12:
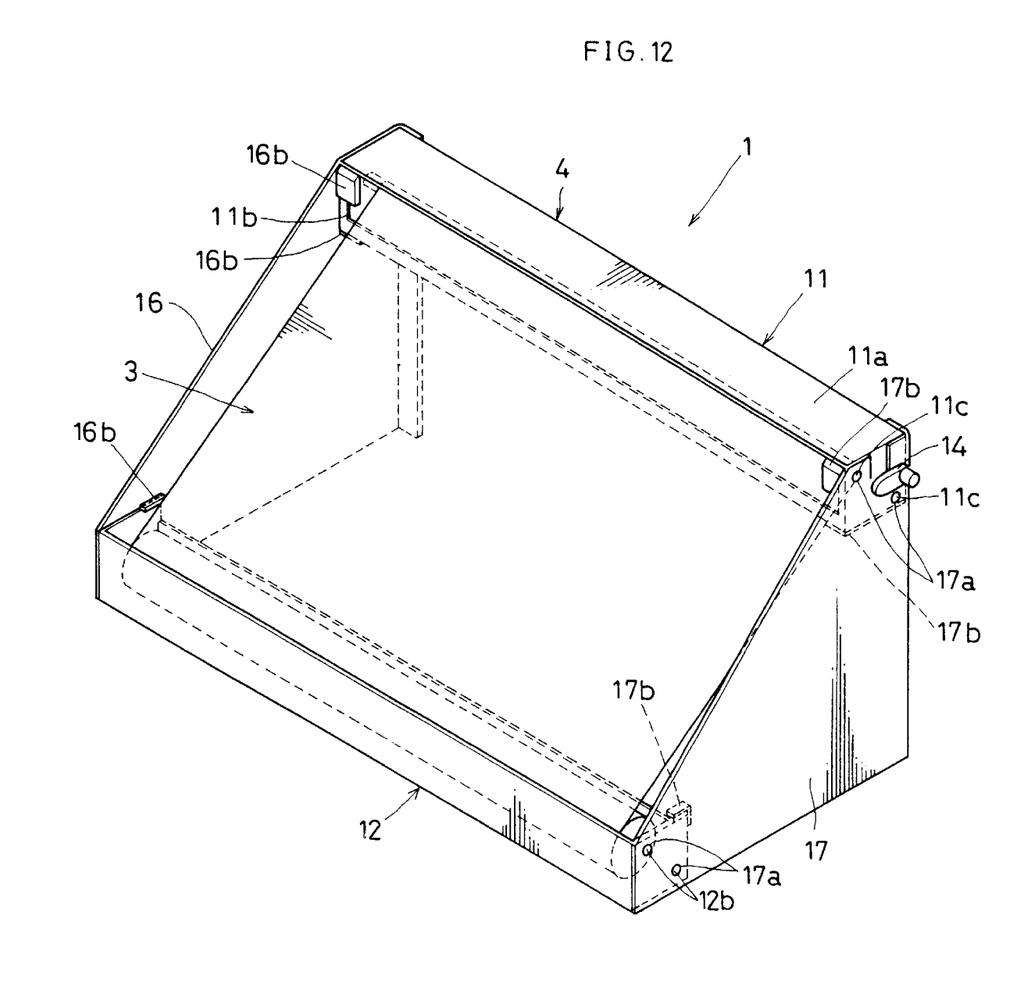
FIG. 12 is a perspective view showing a still further embodiment of the air treating device.
Figure 13:
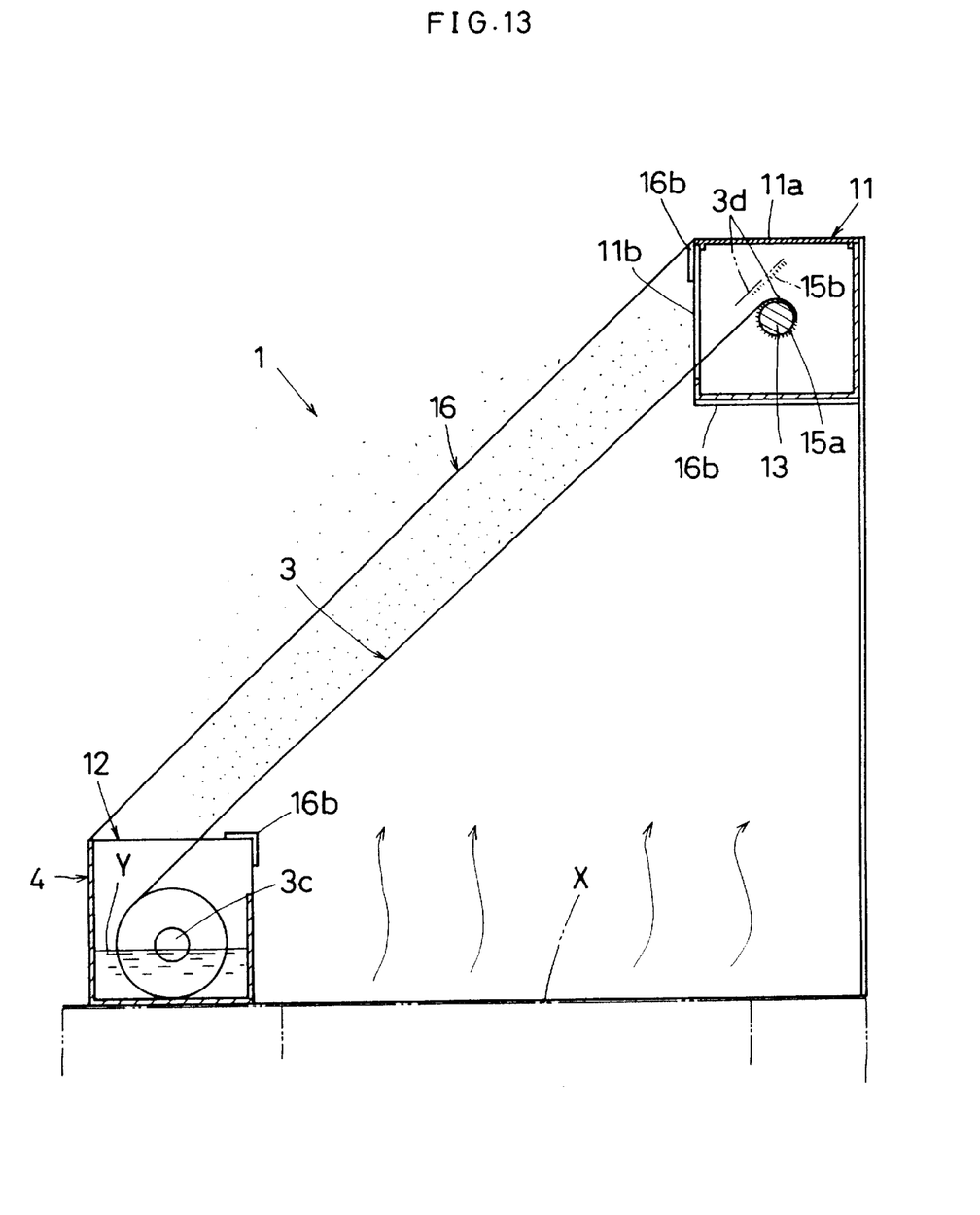
FIG. 13 is a sectional view of the air treating device in FIG. 12.

FIG. 12 and FIG. 13 indicate an embodiment suitable to an air conditioning system having an air feed unit X at its top face. Namely, this air treating device 1 is provided, in the same way as above, with an upper case 11 and a lower case 12, and is detachably fastened with side plates 16, 17 on the left and right sides so that both cases 11, 12 may be disposed to be off-set in the vertical and longitudinal directions.

The upper case 11 has a shape of a slender bottomed box having a detachable lid 11a at its top face, forms a notch 11b on the front face, and is provided with a take-up shaft 13 inside, while a handle 14 is attached to one end of the take-up shaft 13. In addition, a plurality of fitting convex portions 11c, 11c are formed on both the left and right end faces.

The lower case 12 has a shape of a slender bottomed box open at its top face, and a plurality of fitting convex portions 12b, 12b are formed on both the left and right end faces.

The side plates 16, 17 are in a triangle shape in side view, forming fitting holes 17c fitting concave portions, in which the fitting convex portions 11c, 11c are fit, at two non right-angled corners. In addition, at those corners are formed as required control pieces 16b, 17b for preventing mutual displacement between the upper case 11 and the lower case 12.

The air treating device 1 indicated in FIG. 12 and FIG. 13 is used by being mounted on the air feed unit X. Since the bottom face of the air treating device 1 is open, the air fed from the bottom face hits against the diffusing piece 3 from below, and achieves the same effects as above. When the device is not in use, the left and right side places 16, 17 are removed to provide a compact size and improve portability.

Figure 14:
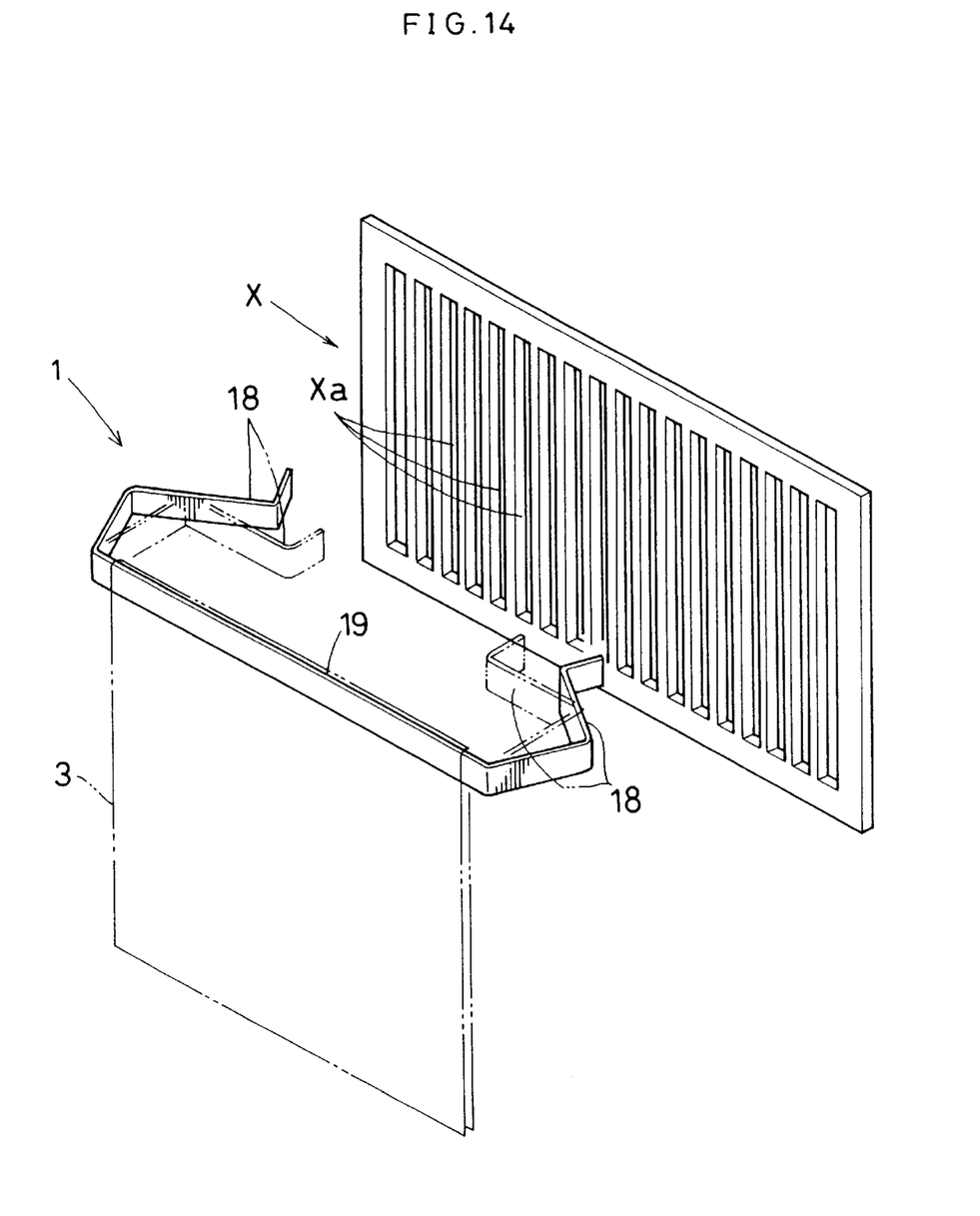
FIG. 14 is a perspective view showing a yet further embodiment of the air treating device.

The air treating device 1 indicated in FIG. 14 is designed to be used by being directly mounted on the air feed unit X, to sharply simplify its construction.

Namely, fastening units 18, 18 both ends of which are bent in the shape of L in a way to be elastically displaceable are formed as mounting means, by using suitable material such as metal or synthetic resin, etc. The fastening units 18, 18 are connected to each other by means of a diffusing piece mounting unit 19. While the fastening units 18, 18 are formed, in FIG. 14, in a way to the spread to outside, they may also be formed in a way to get narrower toward the inside. Moreover, the fastening unit 18 may be fixed by pinching the bars constituting a louver X*a* by means of screw members, or fixed by pinching the bars constituting a louver X*a* by using a pinching unit, etc. urged by a spring.

In the air treating device 1 indicated in FIG. 14, the fastening units 18, 18 at both ends are pushed inward to be narrower, inserted in the louver X*a* of the air feed unit X, and maintained in a fastened state with an elastically returning urging force. At the diffusing piece mounting unit 19 are hung previously prepared diffusing pieces 3 and other proper diffusing pieces 3 such as towels wrung tight after being wetted with water. It may also be possible to hang and support the liquid storing unit 5 at both ends of the diffusing piece mounting unit 19 as required, or provide a separately mounted liquid storing unit 5.

The air treating device 1 indicated in FIG. 14 not only can achieve effects similar to those described above, but also is easy to handle, thus enabling further reduction of size and manufacturing cost.

What is claimed is:

1. A portable air treatment apparatus comprising:

a liquid storage means for storing treatment liquid therein;

at least one liquid absorbent sheet;

means for holding said at least one sheet in contact with said liquid in said liquid storage means so that the liquid will be absorbed thereinto; and means for placing said apparatus into a position where an air supply will flow against said at least one sheet having liquid absorbed therein whereby said liquid is dispersed into the surrounding environment for treatment thereof.

2. The apparatus of claim 1, wherein in a closed state said at least one absorbent sheet is disposed in said storage means and said means for holding comprises means for covering said storage means with said at least one sheet being disposed therein.

3. The apparatus of claim 1, wherein said means for holding comprises means for winding up said at least one sheet.

4. The apparatus of claim 1, comprising a plurality of absorbent sheets.

5. The apparatus of claim 1, wherein said means for holding comprises a cross bar and clip means attached to said cross bar, said clip means being used to attach said at least one sheet.

6. The apparatus of claim 1, wherein said means for placing comprises a suction cup.

7. The apparatus of claim 1, wherein said at least one absorbent sheet comprises paper or cloth.

8. The apparatus of claim 7, wherein said at least one sheet has a plurality of holes therein.

* * * * *